(12) United States Patent
Chung

(10) Patent No.: US 7,069,351 B2
(45) Date of Patent: Jun. 27, 2006

(54) COMPUTER STORAGE DEVICE HAVING NETWORK INTERFACE

(76) Inventor: Keicy K. Chung, P.O. Box 13906, Torrance, CA (US) 90503

( * ) Notice: Subject to any disclaimer, the term of this patent is extended or adjusted under 35 U.S.C. 154(b) by 419 days.

(21) Appl. No.: 10/452,838

(22) Filed: Jun. 2, 2003

(65) Prior Publication Data

US 2004/0243727 A1 Dec. 2, 2004

(51) Int. Cl.
*G06F 15/173* (2006.01)

(52) U.S. Cl. .................... 710/33; 709/203; 709/218; 711/118

(58) Field of Classification Search ............ 710/20–21, 710/33–38, 52–57; 709/203, 212–219, 225; 711/118, 155; 707/265

See application file for complete search history.

(56) References Cited

U.S. PATENT DOCUMENTS

| | | | |
|---|---|---|---|
| 5,313,631 A | 5/1994 | Kao | 395/600 |
| 5,457,796 A | 10/1995 | Thompson | 395/600 |
| 5,628,005 A * | 5/1997 | Hurvig | 707/8 |
| 5,636,359 A | 6/1997 | Beardsley et al. | 711/122 |
| 5,644,782 A | 7/1997 | Yeates et al. | 395/830 |
| 5,751,995 A | 5/1998 | Sarangdhar | 711/145 |
| 5,873,118 A | 7/1998 | Letwin | 711/156 |
| 5,790,848 A | 8/1998 | Wlaschin | 395/617 |
| 5,802,299 A | 9/1998 | Logan et al. | 709/218 |
| 5,806,074 A | 9/1998 | Souder et al. | 707/201 |
| 5,829,012 A | 10/1998 | Marlan et al. | 711/102 |
| 5,832,263 A | 11/1998 | Hansen et al. | 935/681 |
| 5,901,327 A | 5/1999 | Ofek | 395/825 |
| 5,935,207 A | 8/1999 | Logue et al. | 709/219 |
| 5,978,802 A * | 11/1999 | Hurvig | 707/8 |
| 5,987,571 A | 11/1999 | Shibata et al. | 711/141 |
| 5,996,022 A | 11/1999 | Krueger et al. | 709/247 |
| 6,006,299 A | 12/1999 | Wang et al. | 710/108 |
| 6,061,731 A | 5/2000 | Blakeslee | 609/251 |
| 6,061,740 A | 5/2000 | Ferguson et al. | 709/246 |
| 6,065,099 A | 5/2000 | Clark et al. | 711/133 |
| 6,088,694 A | 7/2000 | Burns et al. | 707/8 |
| 6,148,298 A | 11/2000 | LaStrange et al. | 707/5 |
| 6,167,490 A | 12/2000 | Levy et al. | 711/148 |
| 6,275,953 B1 * | 8/2001 | Vahalia et al. | 714/11 |
| 6,292,852 B1 * | 9/2001 | Bodo et al. | 710/20 |
| 6,327,614 B1 | 12/2001 | Asano et al. | 709/213 |
| 6,442,601 B1 | 8/2002 | Gampper et al. | 709/218 |
| 6,442,651 B1 | 8/2002 | Crow et al. | 711/118 |
| 6,623,529 B1 | 9/2003 | Lakritz | 715/536 |
| 6,651,141 B1 | 11/2003 | Adrangi | 711/118 |
| 6,745,295 B1 | 6/2004 | Rodriguez | 711/136 |
| 6,775,695 B1 | 8/2004 | Sarukkai | 709/219 |
| 2002/0002603 A1 | 1/2002 | Vange | 709/219 |
| 2002/0073167 A1 | 6/2002 | Powell et al. | 709/217 |
| 2002/0107935 A1 | 8/2002 | Lowery et al. | 709/216 |
| 2002/0110084 A1 | 8/2002 | Butt et al. | 370/230 |
| 2002/0178341 A1 | 11/2002 | Alexander | |
| 2003/0084152 A1 * | 5/2003 | Chung | 709/225 |
| 2004/0049598 A1 | 3/2004 | Tucker et al. | 709/246 |
| 2004/0172495 A1 | 9/2004 | Gut et al. | 711/1 |

FOREIGN PATENT DOCUMENTS

EP 515073 A2 * 11/1992

* cited by examiner

*Primary Examiner*—Christopher B. Shin
(74) *Attorney, Agent, or Firm*—Fulbright & Jaworski L.L.P.

(57) ABSTRACT

A storage device having network interface comprising a processor communicably connected to a computer interface, a network interface, and a storage means. The processor communicates with a computer and a file server through the computer interface and the network interface, respectively. The computer may request a non-user file from the processor and the processor responds by either (1) providing the requested file to the computer on a read-only basis if the non-user file is cached on the storage means, (2) obtains the requested file from the file server if the non-user file is available from the file server, caches the obtained file on the storage means, and provides the obtained file to the computer on a read-only basis, or (3) returns a file unavailable notice to the computer. The storage device may also provide to the computer read and write access to the storage means for storing user files.

10 Claims, 6 Drawing Sheets

COMPUTER STORAGE DEVICE HAVING NETWORK INTERFACE

BACKGROUND OF THE INVENTION

1. Field of the Invention

The field of the present invention is networkable computer accessories which add functionality to personal computers.

2. Related Applications

The present application is related to U.S. patent application Ser. No. 10/017,923, filed on Oct. 30, 2001, the disclosure of which is incorporated herein by reference as if set forth in full.

3. Background

A typical computer, whether an off-the-shelf or a customized computer for personal, business, specialty, or other use, has many components. Some of the common components are processors, memories, storage devices, input and output devices, and network interfaces. The operating system, such as Microsoft Windows®, Mac OS®, Unix, Linux, etc., is responsible for controlling the components and their functions. In particular, the operating system handles file requests from applications or from the operating system itself. When a file request is received, the operating system attempts to supply the file from one of the local storage devices or from a network server if the computer is connected to a network.

Because there are many different options available for storage devices and network interfaces, the operating system is typically programmed with the characteristics necessary to access almost every storage device and network interface that could be connected to the computer. Thus, for each storage device, the operating system has to be programmed with the storage device type (i.e. magnetic, optical, etc.), the interface type (i.e. IDE, SCSI, etc.), and the physical parameters of the storage device (i.e. number of cylinders, sectors, heads, tracks, etc.). If the computer is connected to a network, the operating system also has to be programmed with the various network interface types (i.e. Ethernet, Token Ring, ATM, etc.), the network protocols (i.e. TCP/IP, IPX, AppleTalk, SNA, etc.), and any particular methods used to communicate with network resources (i.e. servers).

In addition, the operating system also has to be able to manage files on storage devices and over a network. On local storage devices, the operating system typically uses lookup tables or indices, usually referred as file allocation tables, to manage the files. Over the network, the operating system has to be programmed to communicate with a network server and retrieve files. It is often advantageous for the operating system to translate the file information received from the network into a format resembling the file allocation tables to simplify the file retrieval process.

The way an operating system manages components and their functions add complexity to a computer. The complexity is easily seen during the setup process of a computer. Typically, a computer goes through a setup process that would involve (a) booting from a bootable device that can initiate the installation of an operating system, (b) partitioning and formatting local storage devices, (c) installing the full operating system, (d) configuring hardware components such as display cards and network interface, (e) installing and configuring applications, etc., until the computer is prepared for everyday general use.

The complexity is also evident while the computer is in use. Applications and the operating system may require periodic patches or updates, the installation of which frequently involves uninstalling the older versions of the applications or the components of the operating system. Additionally, files may be corrupted due to program errors, user errors, or computer viruses. When this happens, the corrupted files need to be replaced or repaired, a process that may involve reinstalling the applications that use the corrupted files or even possibly reinstalling the operating system itself in some instances.

The complexity involved in using a computer usually results in high maintenance and support costs being incurred. In a business environment, the support costs can easily reach thousands of dollars per user or per computing device. Additionally, the cost of maintaining computers increases because work productivity tends to decrease significantly, often to zero, when computer related problems arise.

Problems related to hardware malfunction, except problems related to storage devices, may often be resolved within a short amount of time. For instance, a broken component, such as a video card or a network interface card, may be quickly replaced with an identical component. However, computer repair may become a lengthy process if the problems are related to storage devices or the files stored on the storage devices. When a hard drive in a computer malfunctions or corrupted files cause problems, the repair and recovery process might involve reinitializing the hard drive, reinstalling the operating system, and/or reinstalling applications.

Numerous methods are presently available to reduce the complexity of computers, shorten the recovery process when problems occur, or to minimize the need for a recovery process altogether. Some of the common methods are cloning the storage device, booting the computer from a network, utilizing specialized computer management software, and applying file level security.

By cloning the storage device, the installation process may be shortened. A computer is first completely set up with a full set of applications. Then the storage device is cloned or duplicated as an "image" file. The image file may then be used to reset the computer to its original condition or to set up identically equipped computers. Many consumer-oriented computers come with recovery CD ROM's containing the factory default image that can be used to restore the storage device to its factory default condition. The drawback of this method is that a new image of the storage device has to be created whenever there is a change in the operating system, applications, or any other files stored on the storage device. Complications may arise using this method in instances when it is necessary to apply patches or updates to the installed software after the storage device is restored from an old image.

The network boot method is often used in conjunction with simple computers that download necessary files from a network server. The computer usually uses a well-know network service, such as BOOTP, TFTP, or PXE, to download and execute a small basic portion of an operating system, which in turn can start downloading the rest of the operating system and any applications. The drawback of this method is that if the computer does not have a local storage device, it has to go through the same boot process of downloading needed files whenever it is powered on or reset. If the computer has a local storage device, this process can benefit by storing downloaded files locally. But then the operating system downloaded over the network is, once again, responsible for the often complex task of managing hardware components and files stored on the local storage device.

The computer management software method is used to enhance the operating system by adding additional software components as agents, daemons, or services. One typical way of using this method is to use anti-virus software that constantly scans stored files for any computer virus infection. This method may also be implemented by adding a software component that constantly monitors important files on the local storage device and attempts to self-heal any damaged or corrupted files. An additional implementation adds a software component that handles file updates pushed out from a server as a part of a computer management tool. The drawback of this method is that the software components acting as agents, daemons, or services are highly dependent on the operating system. The operating system has to provide necessary functions, such as managing local storage devices or network interfaces, for these software components to work properly.

Many operating systems can also apply file level or directory level security to provide certain level of protection against computer viruses, unauthorized access, user errors, or application errors that can corrupt important files. The drawback of this method is that it is operating system dependant, and a super user, an administrator, or a process running with full access privileges can accidentally modify, delete, or corrupt important files in the local storage.

The above methods, by themselves or in combination with other methods, provide some help in reducing the complexities involved with computers. However, none of the methods fundamentally changes how the operating system manages the components of a computer. Thus, a new approach is needed for managing computers and simplifying the manner in which files are distributed over a network.

For purposes of the present description, the term non-user file means a file that is a component of the operating system of a computer, a component of a third-party application, or a file that is designated as one to which a user should have read-only access. In addition, the term user-file as used herein means a file that is not defined as a non-user file and is generated by a user of a computer system.

SUMMARY OF THE INVENTION

The present invention is directed to a storage device for computers and computer systems. The storage device comprises a processor communicably connected to a computer interface, a network interface, and a storage means. The computer interface and the network interface enable the processor to communicate with a computer and a file server, respectively, when the storage device is connected to a computer and a file server. The computer may request a non-user file from the processor. When such a request is made, the processor first checks the storage means to determine whether the requested file is cached on the storage means. If the requested file is cached on the storage means, the non-user file is provided to the computer on a read-only basis.

If the requested file is not cached on the storage means, the processor may obtain the requested file from a file server on the network. Provided the requested file is available from the file server, the processor obtains the non-user file, caches it on the storage means, and provides it to the computer on a read-only basis. Once a non-user file is cached on the storage means, that file is available to the computer upon future request. If the non-user file is not available from the file server, then the processor returns a file unavailable notice to the computer.

The storage device may also receive commands from the file server to delete a file that may have been cached on the storage means. Upon receiving a delete command, the processor will check the storage means for the presence of the file and, if the file is present on the storage means, delete the cached copy of the file.

In a first separate aspect of the present invention, the processor provides the computer with read/write access to the storage means for the temporary storage of user files. At the same time, the processor maintains the computer's read-only access to all non-user files on the storage means.

In a second separate aspect of the present invention, either the storage device or the computer to which the storage device is communicably connected includes a removable media storage component. Selected non-user files from the file server are stored on removable media and made accessible to the processor through the removable media storage component. When the storage device can not communicate with the file server, the processor may obtain the requested file from the removable media if the requested file is among the selected non-user files. A non-user file that is obtained from the removable media is cached on the storage means and provided to the computer on a read-only basis. If the requested file is not among the selected non-user files, the processor returns a file unavailable notice to the computer.

In a third separate aspect of the present invention, any of the previously described aspects may be used in combination.

Accordingly, it is an object of the present invention to provide a storage device having a network interface which may obtain files from a networked file server and make the obtained files available to a computer on a read-only basis. An additional object of the invention is to provide a networked computer system including the storage device, thereby providing a system and method to simplify aspects of file management over a network. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
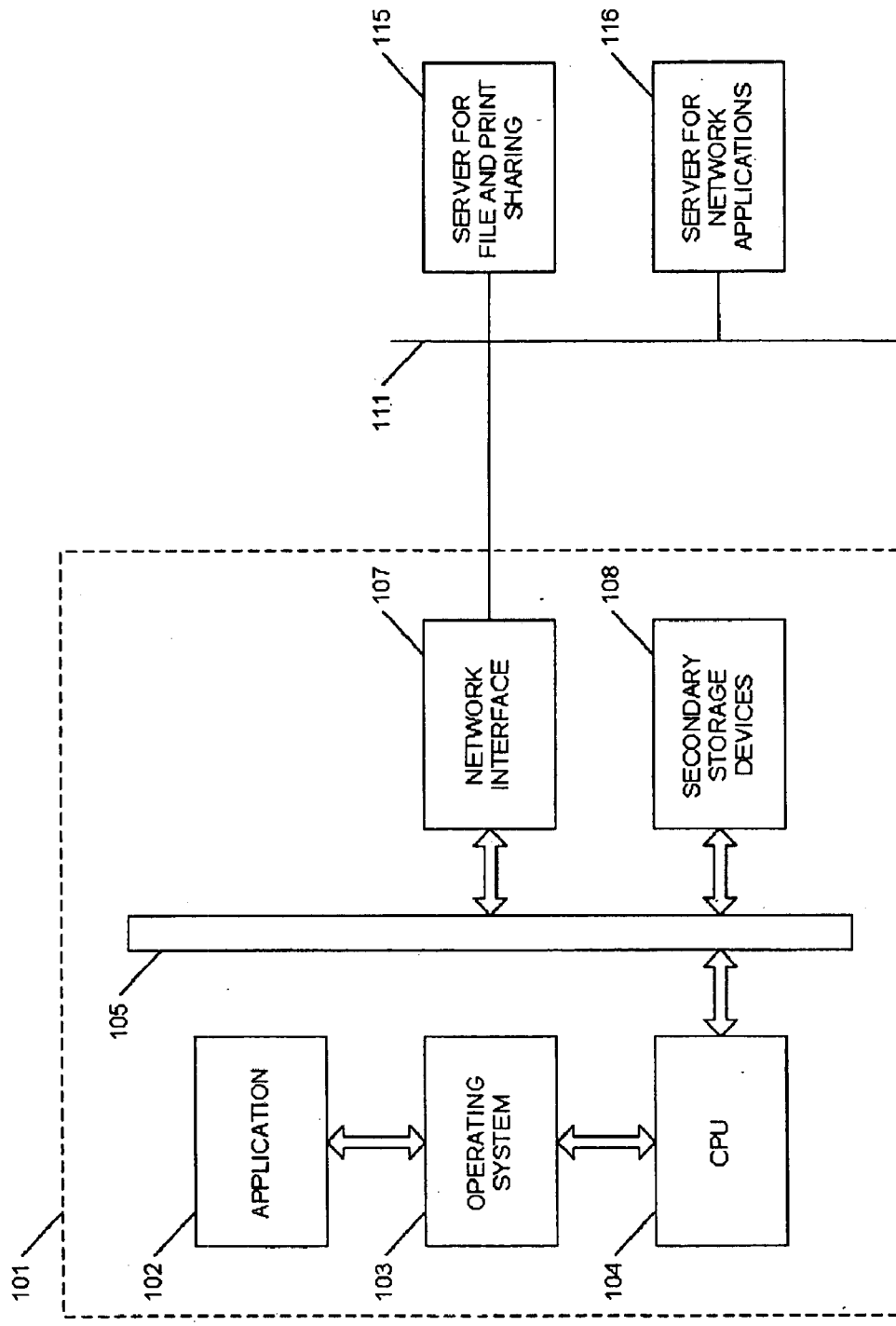
FIG. 1 illustrates a schematic diagram of a networked computer according to the prior art.

Turning in detail to the drawings, FIG. 1 is representative of a typical networked computer 101 as exhibited in the prior art. As used herein, the networked computer 101 may be a personal or business computer, whether an off-the-shelf or a custom built computer, or it may be a specialty device such as a personal digital assistant, a telephone, or a networked appliance. The computer 101 is shown with common components such as the central processing unit 104, the internal interface bus 105 that connects and allows communication between the various components, the network interface 107 that may be wireless or wired to connect the computer 101 to a network 114 having network resources such as a file and print sharing server 115 and/or a network applications server 116, and a secondary storage device 108, such as a hard drive or non-volatile random access memory, where the operating system 103 and application files 102 are typically stored. These components are common to networked computers and are therefore well known to those skilled in the art.

The operating system 103 is responsible for managing the interaction between the components to form a functional computer. In particular, the operating system 103 handles file requests that may originate from applications 102 or from the operating system 103 itself. These file requests arise when the applications 102 or operating system 103 require access to a file which resides on either the secondary storage device 108, the file and print sharing server 115, or the network applications server 116. To handle the file requests, the operating system 103 has to be programmed with the characteristics of numerous storage devices 108 and network interfaces 107 to account for the wide variety of storage devices and network protocols that may be used in conjunction with the computer. The operating system 103 must also be programmed with information that enables it to keep track of files stored on the secondary storage device 108 and how to integrate into the computer's operation the various resources which are available from the various network servers 115, 116. Therefore, under normal operating circumstances, the operating system 103 of the computer 101 must address many different complex tasks.

Figure 2:
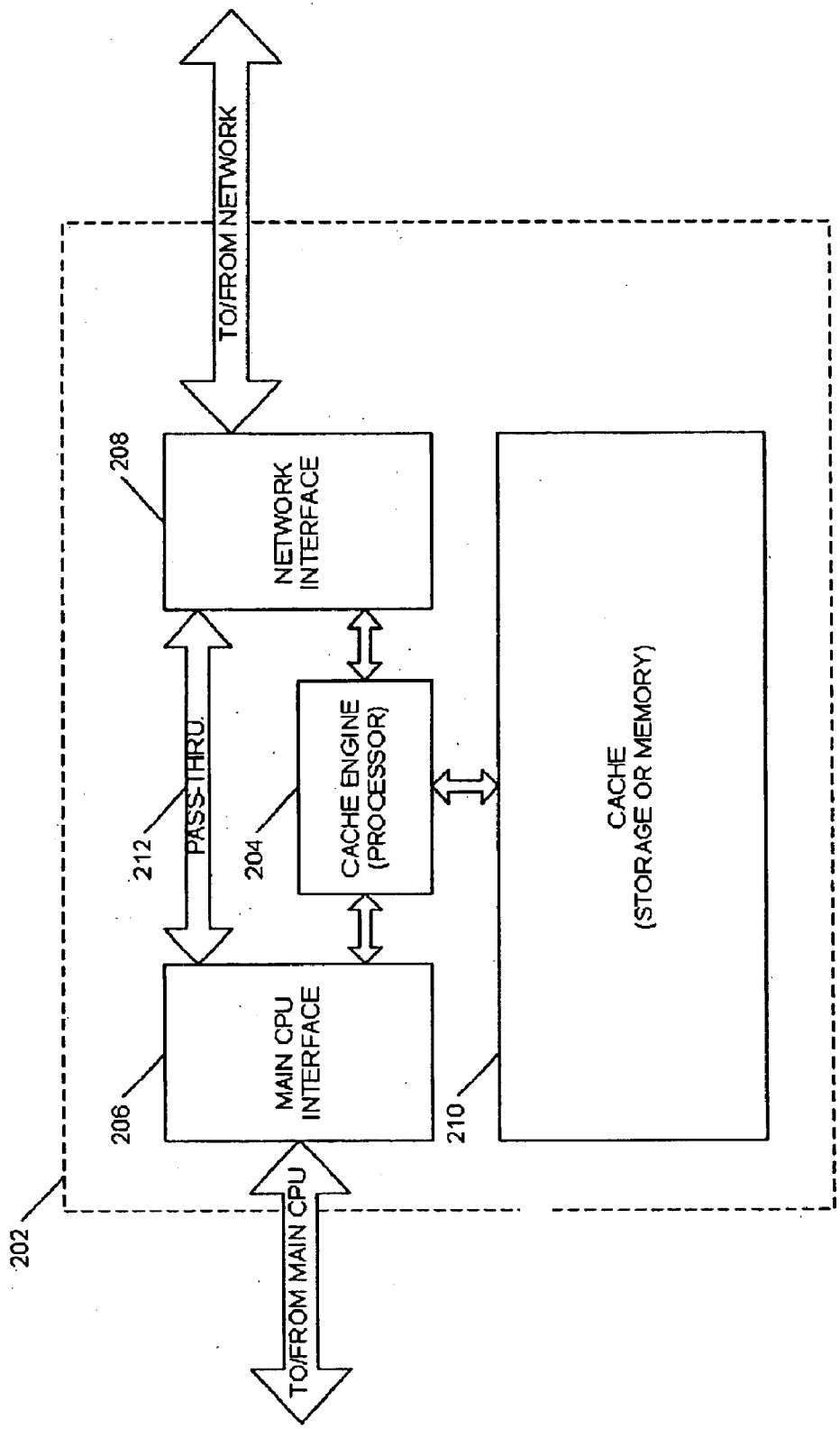
FIG. 2 illustrates a schematic diagram of a read-only storage device.

FIG. 2 is a schematic representation of a cache based device (CBD) 202. The CBD is intended to be used in conjunction with a computer, such as the computer illustrated in FIG. 1, to simplify the tasks required of the operating system when managing the various computer components and the interaction with one or more network servers. The CBD 202 has four basic components: the cache engine (or processor) 204, the main computer interface 206, the network interface 208, and the cache (or storage means) 210.

The cache engine 204 is communicably connected to and manages the other components of the CBD 202. Two specific functions of the cache engine 204 is to (1) keep track of the files stored on the cache 210 and (2) maintain the interface with the cache 210, the overall goal being to relieve the operating system of these duties. The cache engine 204 also processes file requests from the operating system of the computer and commands received from a file server.

The computer interface 206 enables the cache engine 204 to communicate with a computer when the CBD 202 is connected to a computer. Similarly, the network interface 208 enables the cache engine 204 to communicate with other devices over a communication network when the CBD 202 is connected to such a network. The computer interface 206 and the network interface 208 are also communicably connected to each other via a pass-thru connection 212, across which certain network communications may bypass the processor.

The cache engine 204 may be any type of central processing unit appropriate to control the functions of the CBD 202 as described herein. The particular type of central processing unit used is a matter of design choice. Acceptable central processing units are available from the integrated circuit divisions of vendors such as ARM, Hewlett-Packard (HP), International Business Machines (IBM), Intel, and Advanced Micro Devices (AMD), among others.

The computer interface 206 and the network interface 208 may each be any type of appropriate interface that enables the cache engine 204 to communicate with a computer and a network, respectively. The particular method of interconnecting the computer and the network to the CBD 202 is a matter of design choice. Proprietary interconnection protocols may be incorporated into the CBD 202, or alternatively, the CBD 202 may include interconnection protocols that are compatible with existing standards. Methods utilizing commonly known formats such as IDE, ATA, SCSI, and IEEE 1394, among others, are acceptable for the computer interface 206. Methods utilizing commonly known network interface types, such as Ethernet, Token Ring, and ATM, among others, and network protocols such as TCP/IP, IPX, AppleTalk, and SNA, among others, are acceptable for the network interface 208. Such components are generally widely available from a variety of computer hardware vendors.

The particular type of storage used for the cache 210 is also a matter of design choice. The cache 210 may be any type of random access media that is well known to those skilled in the art, such as a hard drive, DRAM, SDRAM, flash memory, and any type of removable random access media. The programming used by the cache engine 204 must be adapted to function with the particular type of random access media chosen.

The cache engine 204 is programmed to manage the files stored on the cache 210 and interact with the computer and network as needed. The programming may be in any programming language, such as C++, Java, etc., and the compiled program may be embedded into the cache engine 204 itself, or it may be stored in a separate memory specifically provided for such a purpose. Alternatively, the programming may be stored within the cache 210 for access by the cache engine 204. The programming permits the cache engine 204 to communicate with a computer, giving the computer access to files stored in the cache 210 on a read-only basis. The programming also permits the cache engine 204 to communicate with a network through the network interface 208. Thus, when a computer requests a file from the CBD 202 that is not stored in the cache 210, the cache engine 204 may request the file from a server on the network the CBD 202 is connected to in an attempt to obtain the requested file. If the requested file is found on the network, the cache engine 204 will store the file in the cache 210 and give the computer access to the file on a read-only basis. If the requested file is not available, either within the cache 210 or on the network, the cache engine 204 may provide the computer with a notice that the requested file is unavailable.

A CBD may thus be operating system independent because the CBD does not have to conform to any particular protocols or file structures. An operating system needs to be programmed only with the protocol needed to request files stored on the CBD because the cache engine, and not the operating system, manages the files stored on a CBD. Thus, communication between the operating system and the CBD may be performed using a small number of procedures. These procedures would be the only ones dependent on the operating system and system architecture, and they can be standardized on any hardware platform.

Figure 3:
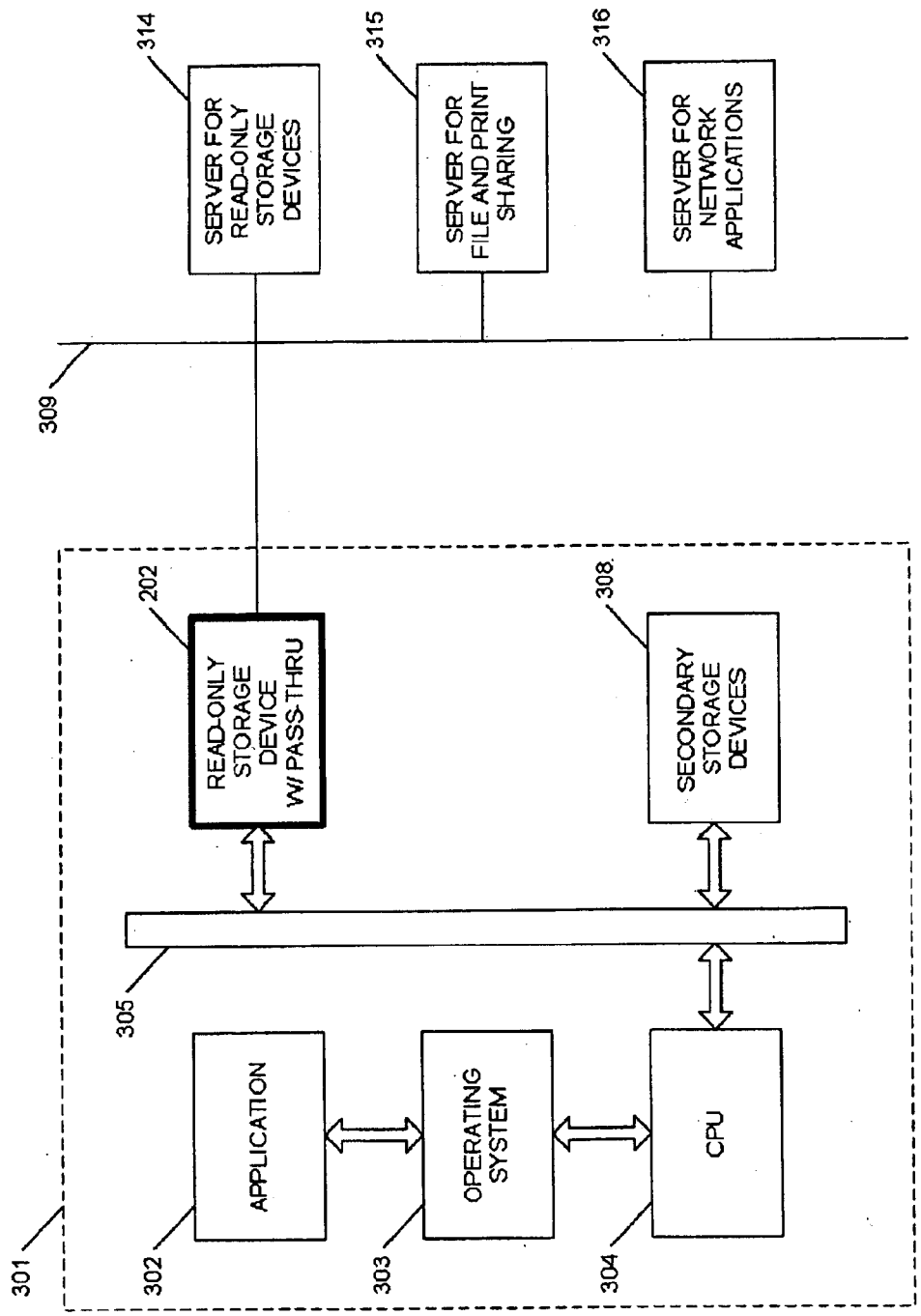
FIG. 3 illustrates a schematic diagram of the device of FIG. 2 incorporated into a networked computer.

FIG. 3 illustrates a networked computer 301 which includes an internally incorporated CBD 202. The CBD 202 may also be external to the computer 301 without losing any of the functionality described herein. As in the prior art, the computer includes a CPU 304, an interface bus 305, and a secondary storage device 308. The operating system 303 integrates the operation of the various components and the applications 302 are executed within the environment created by the operating system 303. The CPU 304 utilizes the interface bus 305 to communicate with the secondary storage device 308, the CBD 202, and the network 309 to which the computer is connected. The CBD 202 is connected to the interface bus 305 via the computer interface (not shown in FIG. 3), thus allowing communications between the CBD 202 and the other components of the computer 301. The CPU 304 communicates with the network 309 via the pass-thru connection (not shown in FIG. 3) within the CBD 202.

The computer 301 in FIG. 3 is connected to three different servers residing on a single network. The first server is a CBD file server 314 that communicates primarily with the CBD 202. It may be desirable, but not necessary, to have the CBD 202 be the only device type on the network that communicates with the CBD file server 314. In other words, the CBD file server 314 will not communicate with any device other than the CBD 202 and the CBD 202 will not communicate with any server other than the CBD file server 314. However, if the CBD 202 is limited to communication with only the CBD server 314, the CBD 202 should not limit in any way the network traffic using the pass-thru connection the computer 301 uses to communicate with other servers that may reside on the network.

The second and third servers are the file and print sharing server 315 and a network applications server 316, respectively. These servers communicate primarily with the operating system 303 through the CPU 304. Communications between these servers and the computer 301 utilize the pass-thru connection within the CBD 202.

Those skilled in the art will recognize that many alternative server and network configurations are possible, such as, for example merging one or more of the servers in FIG. 3 into a single server or adding more servers for additional functionality. The network may be formed of copper-based wiring, optical fibers, wireless communications, or any other type of networking known to those skilled in the art.

Figure 4:
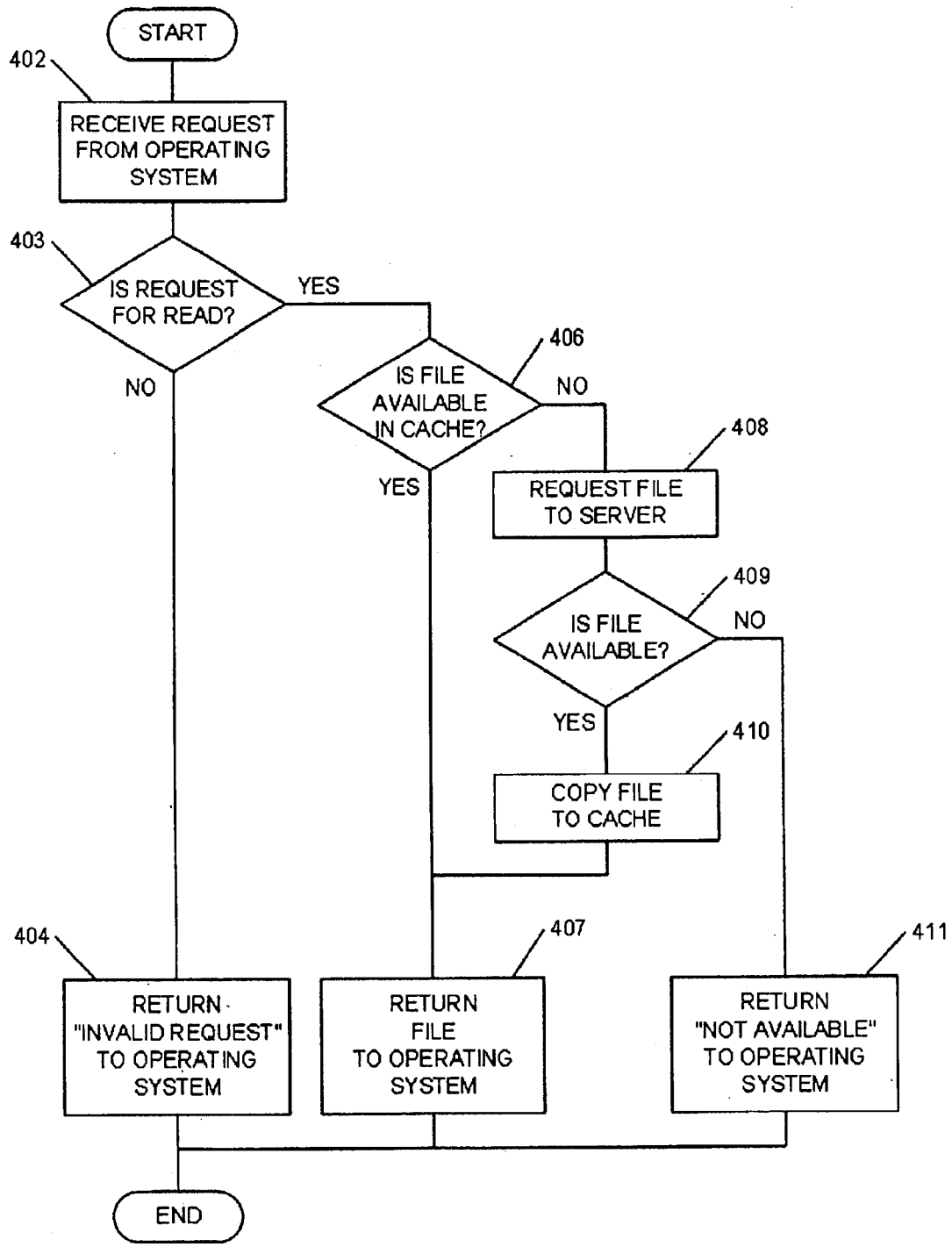
FIG. 4 is a flow chart illustrating an algorithm the read-only storage device may use in response to a file request from a computer.

FIG. 4 illustrates a flowchart of the logic the cache engine may follow in responding to a request from the operating system for a non-user file. When the cache engine receives such a request 402 for a non-user file, it checks whether the request is for a file read 403, as opposed to, for example a file write or file delete. If the request is not for a file read, the cache engine rejects the request 404 by returning an "Invalid Request" notice to the operating system. If the request is for a file read, the cache engine checks the cache 406 to see if the non-user file is available from the cache. If the requested file is available from the cache, the cache engine returns the non-user file 407 to the operating system. If the requested file is not available from the cache, the cache engine sends a request 408 for the non-user file to a CBD file server. The request may be in the form of a broadcast to any and all CBD file servers on the network, or the request may be made to a specific CBD file server on the network. The method used depends on the particular network the CBD is connected to. If the requested file is available from a CBD file server 409, the cache engine retrieves the non-user file 410 from the CBD server and copies it to the local cache. The retrieved file is also forwarded 407 to the operating system. If the requested file is not available from a CBD file server, the cache engine notifies the operating system 411 by returning a "File Not Available" notice to the operating system.

In addition to retrieving non-user files from the CBD server at the request of the operating system, the CBD may also be pre-programmed to retrieve and cache non-user files as based on a schedule or as instructed by the CBD file server. The non-user files cached on the CBD may be deleted based on one or more criteria, thus forcing the CBD to re-retrieve the non-user file from the CBD server at the next instance the non-user file is needed. File deletions may be forced at the prompting of the CBD server, or certain non-user files may have an associated file expiration tag, thus causing the CBD to delete the non-user file at the time indicated by the file expiration tag. The file expiration tag may indicate an absolute date or time, or a date or time based on an anticipated event.

The CBD may be programmed to allow the operating system or applications active on the computer to read and write user files to the cache. Most of today's operating systems or applications require some sort of space on a secondary storage device to store user files. For instance, when a computer running Microsoft Windows XP is put into a hibernate or sleep mode, the operating system stores information in the computer's memory as a temporary file on the computer's hard drive (the secondary storage device). The Linux operating system, running on a personal computer, and the Sun Solaris operating system, running on a SPARC-based workstation, also employ memory management techniques that temporarily store data from the computer's volatile memory on the computer's hard drive. These temporary user files are often referred to as swap files, and the CBD may be programmed to allow the operating system read and write access to the CBD cache for purposes of storage of these swap files. By including this ability as part of the CBD programming, the secondary storage device may be eliminated from the computer illustrated in FIG. 3 because the CBD would provide the same functionality as the secondary storage device.

Many applications also use temporary space on a secondary storage device to make backup copies of user files when the user is working on them. When the user is finished working on the files, they are often moved and stored to a network file server in a user's home directory so that they may be accessed from anywhere on the network and archived by a central backup system. The CBD may be programmed to provide temporary storage space for such user files on the CBD cache when they are modified or newly created by applications. The CBD cache would temporarily store the user files on a read-write basis, again allowing the elimination of the computer's secondary storage device. Even though the CBD is programmed to provide temporary space for user files on a read-write basis, the CBD would still safely provide read-only access to non-user files in the manner previously described.

A CBD that is programmed to provide a computer read-write access to the CBD cache may also be programmed to automatically back up the user files to a network location. Such automatic back ups of user files by the CBD would eliminate the need for archiving software on the computer itself and would free additional computer resources for other purposes.

Figure 5:
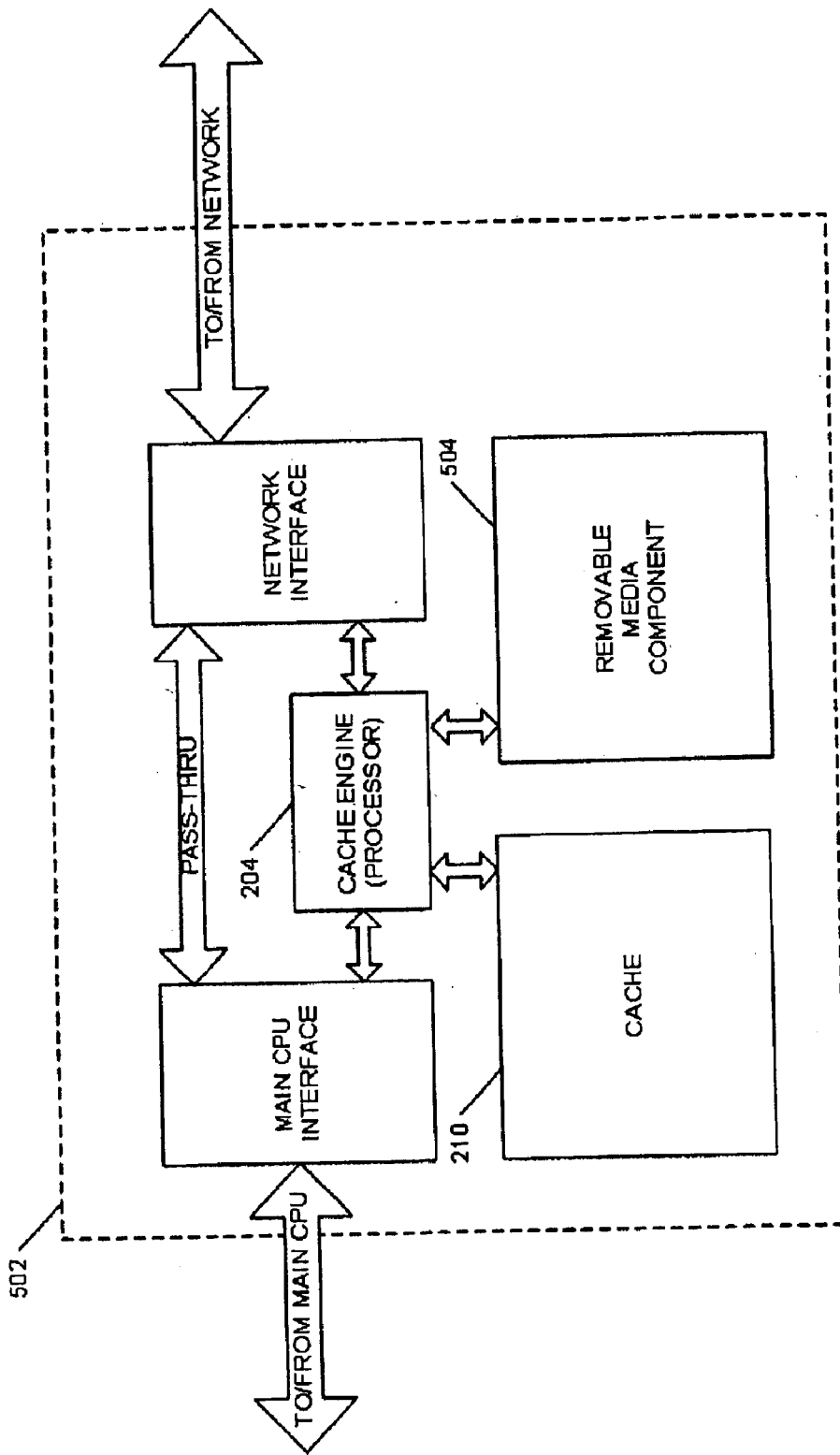
FIG. 5 illustrates a schematic diagram of a first alternative read-only storage device.

FIG. 5 illustrates a CBD 502 as previously described with the addition of a removable media storage component 504. The removable media storage component 504 enables the CBD 502 to operate in a manner similar to that previously described when disconnected from the CBD file server, although some functionality may be lost. Access to the non-user files stored on a CBD file server is maintained by copying a selection of the non-user files to removable media and making the removable media accessible to the cache engine 204 through the removable media storage component 504. Thus, when the CBD 502 cannot communicate with the CBD file server, the CBD 502 may access and search the removable media to determine whether the non-user file requested by the computer is stored amongst the selection of non-user files copied to the removable media. If the requested file is found on the removable media, the cache engine 204 copies the non-user file to the cache 210, and provides the requested file to the computer on a read-only basis as previously described.

Figure 6:
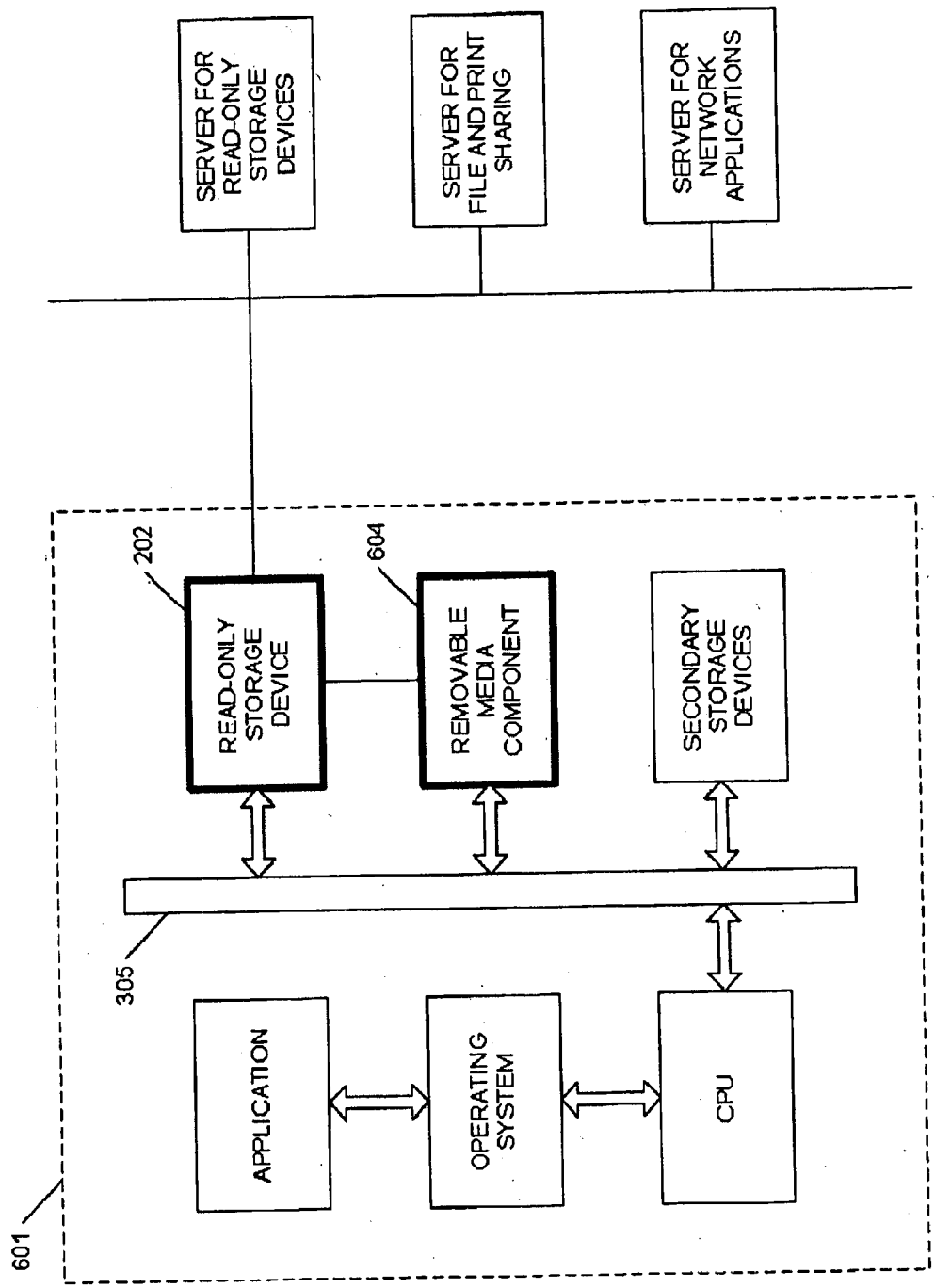
FIG. 6 illustrates a schematic diagram of a second alternative read-only storage device.

FIG. 6 illustrates an alternative embodiment wherein the removable media storage component 604 is integrated into the computer 601 and is communicably connected to the bus interface 305. With this configuration, the CBD 202 may communicate with the removable media storage component 604 via the bus interface 305.

The removable media storage component described above may be any type of removable storage medium known to those skilled in the art, such as CD-ROM drives, DVD drives, removable hard drives, and removable nonvolatile memory, among others. However, despite the wide range of options for the removable media storage component, if it is integrated into the CBD, such as is illustrated in FIG. 5, then any of the above types are equally preferable because the cache engine would tightly control the computer's read-only access to the selected non-user files on the removable media and prohibit the computer write access to the selected non-user files. Comparatively, in the configuration illustrated in FIG. 6, the computer would be able to directly access the selected files on the removable media without the cache engine acting as an intermediary. Therefore, for such a configuration, the removable media is preferably write protected or read only, such as the CD-ROM or DVD option indicated above.

Thus, a storage device having a network interface is disclosed. While embodiments of this invention have been shown and described, it would be apparent to those skilled in the art that many more modifications are possible without departing from the inventive concepts herein. The invention, therefore, is not to be restricted except in the spirit of the following claims.

What is claimed is:

1. A storage device comprising:
   a processor;
   a computer interface communicably connected to the processor to enable the processor to communicate with a computer,
   a network interface communicably connected to the processor to enable the processor to communicate with a file server; and
   a storage means communicably connected to the processor;
   wherein the processor provides the computer read and write access to the storage means so that the computer may store user files on the storage means; and
   wherein the computer may request a non-user file from the processor and the processor either (1) provides the non-user file to the computer on a read-only basis if the file is cached on the storage means, (2) obtains the non-user file from the file server if the non-user file is available from the file server, caches the obtained non-user file on the storage means, and provides the obtained non-user file to the computer on a read-only basis, or (3) returns a file unavailable notice to the computer.

2. The storage device of claim 1, wherein the computer is communicably connected to a network server through the network interface.

3. The storage device of claim 1, wherein the storage means comprises random access media.

4. The storage device of claim 1, further comprising a removable media storage component communicably connected to the processor, wherein removable media which includes a read-only copy of selected non-user files available from the file server is made accessible to the processor through the removable media storage component so that, when the storage device can not communicate with the file server, the processor accesses the selected non-user files and, if the requested non-user file is available from the removable media, obtains the non-user file, caches the obtained non-user file on the storage means, and provides the obtained non-user file to the computer on a read-only basis.

5. A storage device comprising:
   a processor;
   a computer interface communicably connected to the processor to enable the processor to communicate with a computer;
   a network interface communicably connected to the processor to enable the processor to communicate with a file server;
   a storage means communicably connected to the processor; and
   a removable media storage component communicably connected to the processor, wherein removable media which includes a read-only copy of selected non-user files stored on the file server is made accessible to the processor through the removable media storage component;
   wherein the computer may request a non-user file from the processor and the processor either (1) provides the non-user file to the computer on a read-only basis if the file is cached on the storage means; (2) obtains the non-user file from the file server if the non-user file is available from the file server, caches the obtained non-user file on the storage means, and provides the obtained non-user file to the computer on a read-only basis; (3) accesses the selected non-user files when the storage device can not communicate with the file server and, if the requested non-user file is available from the removable media, obtains the non-user file from the removable media, caches the obtained non-user file on the storage means, and provides the obtained non-user file to the computer on a read-only basis; or (4) returns a file unavailable notice to the computer.

6. The storage device of claim 5, wherein the computer is communicably connected to a network server through the network interface.

7. The storage device of claim 5, wherein the storage means comprises random access media.

8. A storage device comprising:
   a processor;
   a network interface communicably connected to the processor to enable the processor to communicate with a file server;
   a computer interface communicably connected to the processor to enable the processor to communicate with a computer, wherein the computer includes a removable media storage component and removable media which includes a read-only copy of selected non-user files stored on the file server is made accessible to the processor through the removable media storage component; and
   a storage means communicably connected to the processor;

wherein the computer may request a non-user file from the processor and the processor either (1) provides the non-user file to the computer on a read-only basis if the file is cached on the storage means; (2) obtains the non-user file from the file server if the non-user file is available from the file server, caches the obtained non-user file on the storage means, and provides the obtained non-user file to the computer on a read-only basis; (3) accesses the selected non-user files when the storage device can not communicate with the file server and, if the requested non-user file is available from the removable media, obtains the non-user file from the removable media, caches the obtained non-user file on the storage means, and provides the obtained non-user file to the computer on a read-only basis; or (4) returns a file unavailable notice to the computer.

9. The storage device of claim 8, wherein the computer is communicably connected to a network server through the network interface.

10. The storage device of claim 8, wherein the storage means comprises random access media.

* * * * *